US009097123B2

(12) United States Patent
Holmes et al.

(10) Patent No.: US 9,097,123 B2
(45) Date of Patent: Aug. 4, 2015

(54) METHOD AND SYSTEM FOR ASSEMBLING AND DISASSEMBLING TURBOMACHINES

(75) Inventors: James Bradford Holmes, Fountain Inn, SC (US); Kenneth Damon Black, Travelers Rest, SC (US); Christopher Paul Cox, Greenville, SC (US); Matthew Stephen Casavant, Greenville, SC (US); Bradley Edwin Wilson, Simpsonville, SC (US); Brett Darrick Klingler, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 13/558,526

(22) Filed: Jul. 26, 2012

(65) Prior Publication Data

US 2014/0026414 A1 Jan. 30, 2014

(51) Int. Cl.

| | |
|---|---|
| ***F01D 25/26*** | (2006.01) |
| ***F01D 25/28*** | (2006.01) |
| ***F01D 25/24*** | (2006.01) |
| ***F03B 11/02*** | (2006.01) |
| ***F04D 29/60*** | (2006.01) |
| ***B23P 6/00*** | (2006.01) |
| ***B23P 23/00*** | (2006.01) |
| ***B23P 19/04*** | (2006.01) |
| ***B23P 19/00*** | (2006.01) |
| ***F01D 9/04*** | (2006.01) |

(52) U.S. Cl.

CPC *F01D 9/04* (2013.01); *F01D 25/28* (2013.01); *F05D 2230/60* (2013.01); *F05D 2230/70* (2013.01); *Y10T 29/49238* (2015.01); *Y10T 29/53* (2015.01)

(58) Field of Classification Search

CPC ....... F01D 9/04; F01D 25/28; F05D 2230/60; F05D 2230/70; Y10T 29/53; Y10T 29/49238; Y10T 29/49236; Y10T 29/5303

USPC ............... 29/426.1, 426.2, 426.3, 889, 889.1, 29/889.2, 402.01, 402.08, 244–282, 700; 415/213.1, 214.1, 215.1

See application file for complete search history.

(56) References Cited

U.S. PATENT DOCUMENTS

| | | | | |
|---|---|---|---|---|
| 3,432,911 | A | 3/1969 | Rodgers | |
| 3,493,212 | A * | 2/1970 | Scalzo et al. | 415/127 |
| 3,602,482 | A * | 8/1971 | Guinot | 254/361 |
| 3,997,962 | A | 12/1976 | Kleitz et al. | |
| 4,044,442 | A | 8/1977 | Carlson | |
| 4,157,613 | A | 6/1979 | Morrow | |
| 4,451,979 | A | 6/1984 | Schuster | |
| 4,491,307 | A * | 1/1985 | Ellefson | 269/55 |

(Continued)

*Primary Examiner* — Essama Omgba
*Assistant Examiner* — Darrell C Ford
(74) *Attorney, Agent, or Firm* — Ernest G. Cusick; Gary M. Hartman; Michael D. Winter

(57) ABSTRACT

A method and system adapted for removing one or more shells from an assembly of multiple annular shells, for example, turbine shells of a gas turbine engine. The method includes removing an upper shell positioned in an upper position relative to a lower shell of the assembly of multiple annular shells, and then positioning and securing a counterweight in the upper position and securing the counterweight to the lower shell as a replacement for the upper shell in the upper position. The counterweight and the lower shell are then rotated in unison until the lower shell is in the upper position and the counterweight is in a lower position previously occupied by the lower shell. Thereafter, the lower shell can be removed from the assembly.

8 Claims, 8 Drawing Sheets

(56) References Cited

U.S. PATENT DOCUMENTS

| | | | | |
|---|---|---|---|---|
| 4,567,649 | A | 2/1986 | Ades et al. | |
| 4,659,195 | A * | 4/1987 | D'Amelio et al. | 359/503 |
| 4,832,574 | A | 5/1989 | Woodwell et al. | |
| 5,105,658 | A * | 4/1992 | Jaafar et al. | 73/865.8 |
| 5,267,397 | A | 12/1993 | Wilcox | |
| 5,575,145 | A | 11/1996 | O'Neill et al. | |
| 5,685,693 | A * | 11/1997 | Sexton et al. | 415/173.1 |
| 5,779,442 | A * | 7/1998 | Sexton et al. | 415/173.2 |
| 5,906,473 | A * | 5/1999 | Sexton et al. | 415/173.2 |
| 5,913,658 | A * | 6/1999 | Sexton et al. | 415/201 |
| 5,921,075 | A * | 7/1999 | Shimoyama et al. | 60/797 |
| 5,971,702 | A | 10/1999 | Afton et al. | |
| 6,079,943 | A * | 6/2000 | Sexton et al. | 415/115 |
| 6,082,963 | A * | 7/2000 | Sexton et al. | 415/115 |
| 6,168,871 | B1 | 1/2001 | Ritter et al. | |
| 6,189,211 | B1 * | 2/2001 | Suter | 29/889.1 |
| 6,224,332 | B1 | 5/2001 | Leach et al. | |
| 6,279,309 | B1 | 8/2001 | Lawlor et al. | |
| 6,402,468 | B1 | 6/2002 | Florin et al. | |
| 6,457,936 | B1 | 10/2002 | Leach et al. | |
| 6,532,840 | B2 * | 3/2003 | Hatley et al. | 73/866.5 |
| 6,546,616 | B2 | 4/2003 | Radowick | |
| 6,609,878 | B1 | 8/2003 | Ootoshi et al. | |
| 6,837,673 | B2 | 1/2005 | Ebata et al. | |
| 6,839,979 | B1 | 1/2005 | Godbole et al. | |
| 6,913,441 | B2 * | 7/2005 | Fadok | 415/189 |
| 6,969,239 | B2 | 11/2005 | Grant et al. | |
| 7,273,348 | B2 | 9/2007 | Amirtharajah et al. | |
| 7,617,602 | B2 | 11/2009 | Dupin et al. | |
| 7,721,434 | B2 | 5/2010 | Weaver et al. | |
| 7,726,022 | B2 | 6/2010 | Trbojevic et al. | |
| 7,770,292 | B2 | 8/2010 | Stretton | |
| 7,941,905 | B2 | 5/2011 | Garland et al. | |
| 7,976,266 | B2 | 7/2011 | Brown et al. | |
| 8,117,727 | B2 * | 2/2012 | McCarvill | 29/426.5 |
| 8,844,107 | B2 * | 9/2014 | Casavant et al. | 29/240 |
| 2004/0213653 | A1 * | 10/2004 | Tomko et al. | 414/458 |
| 2010/0083499 | A1 * | 4/2010 | Shigemoto et al. | 29/889.1 |
| 2010/0111665 | A1 | 5/2010 | Daniels | |
| 2010/0143113 | A1 * | 6/2010 | Itter | 415/214.1 |
| 2011/0185570 | A1 * | 8/2011 | Bird | 29/888.021 |
| 2012/0093639 | A1 * | 4/2012 | Ballard et al. | 415/213.1 |
| 2012/0145976 | A1 * | 6/2012 | Hynous et al. | 254/98 |
| 2012/0156015 | A1 * | 6/2012 | Devi et al. | 415/181 |
| 2014/0017076 | A1 * | 1/2014 | Wilson et al. | 415/213.1 |

* cited by examiner

METHOD AND SYSTEM FOR ASSEMBLING AND DISASSEMBLING TURBOMACHINES

BACKGROUND OF THE INVENTION

The present invention generally relates to methods and equipment suitable for use when assembling and disassembling turbomachines. More particularly, this invention relates to a method and system capable of installing and uninstalling inner turbine shells of a turbine engine.

In the hostile operating environments of gas turbine engines, the structural integrity of turbine rotor wheels, buckets, and other components within their turbine sections is of great importance in view of the high mechanical stresses that the components must be able to continuously withstand at high temperatures. For example, the regions of a turbine wheel forming slots into which the buckets are secured, typically in the form of what are known as dovetail slots, are known to eventually form cracks over time, necessitating monitoring of the wheel in these regions. The ability to detect and repair cracks is desirable in order to avoid catastrophic failure of a turbine wheel. While a turbine rotor can be completely disassembled to gain access to its individual components, inspection and maintenance techniques that can be performed with limited disassembly are preferred to minimize downtime, such as to fit within outage schedules of a land-based gas turbine engine employed in the power generating industry.

The construction of turbine sections that utilize multiple shells has become a common approach for facilitating the on-site maintenance of land-based gas turbine engines. A particular example is a dual shell design used for gas turbine engines manufactured by the General Electric Company, a notable example being the 9FB, 9H and 9FB.05 class gas turbines. As known in the art, turbines having this type of construction include casings, shells and frames that are split on the machine horizontal centerline, such that upper halves of the casings, shells and frames may be lifted individually for access to internal parts of the turbine. For example, by lifting the upper half of a turbine shell, the turbine rotor wheels, buckets and nozzle assemblies can be inspected and possibly repaired or replaced without necessitating removal of the entire turbine rotor. Prior to shell removal, proper machine centerline support using mechanical jacks is necessary to assure proper alignment of the rotor, obtain accurate half-shell clearances, etc.

With the use of a dual shell design as described above, the need to remove the turbine rotor from the inner turbine shell for the purpose of inspection and maintenance is often reduced or eliminated, with the result that downtime can be minimized by allowing the rotor and its components to be inspected and maintained at the same time that other internals of the rotor section are inspected and maintained. However, while the removal of the upper half of the turbine shell provides ready access to the exposed portions of the rotor wheels and buckets, access to those portions of the rotor wheels and buckets located in the lower half of the turbine shell is complicated by the presence of the lower half of the turbine shell. The location of the lower turbine shell and the precision of its installation in the turbine section present significant challenges to its removal and reinstallation for the purpose of conducting a complete inspection of the turbine section.

In view of the above, it would be desirable if a method existed that was capable of installing and uninstalling the lower inner turbine shell of a gas turbine engine.

BRIEF DESCRIPTION OF THE INVENTION

The present invention provides a method and system adapted for installing and removing a shell from an assembly of multiple annular shells, for example, installing and removing an inner turbine shell of a turbine engine.

According to a first aspect of the invention, the method includes removing an upper shell positioned in an upper position relative to a lower shell of the assembly of multiple annular shells, positioning and securing a counterweight in the upper position and securing the counterweight to the lower shell as a replacement for the upper shell in the upper position, rotating the counterweight and the lower shell in unison until the lower shell is in the upper position and the counterweight is in a lower position previously occupied by the lower shell, and then removing the lower shell from the assembly.

According to a second aspect of the invention, the system includes a counterweight adapted to replace an upper shell positioned in an upper position relative to a lower shell of the assembly of multiple annular shells, and also adapted to be secured to the lower shell. The system further includes a device adapted to rotate the counterweight and the lower shell in unison until the lower shell is in the upper position and the counterweight is in the lower position, thereby permitting the lower shell to be readily removed from the assembly.

A technical effect of the invention is the ability of the method and system to install and remove individual shells from an assembly of multiple annular shells, a particularly notable example of which is the removal of the lower inner turbine shell of a turbine engine. In particular, the invention allows for the removal of the lower portion of a turbine shell which, in combination with the conventional removal of the upper portion of the turbine shell, provides easy access to components within the turbine section, for example, the exposed portions of a turbine rotor, including its wheels and buckets, while allowing the rotor to remain in place within the rotor section. The invention is also able to overcome difficulties arising from the location of the lower turbine shell within the turbine section of a gas turbine engine and the precision of its installation within the turbine section.

Other aspects and advantages of this invention will be better appreciated from the following detailed description.

DETAILED DESCRIPTION OF THE INVENTION

The present invention will be described in terms of a method and system capable of installing and removing a shell from an assembly comprising multiple annular shells. While various applications are foreseeable and possible, applications of particular interest include installing and uninstalling inner turbine shells of gas turbines, including land-based gas turbine engines.

Figure 1:
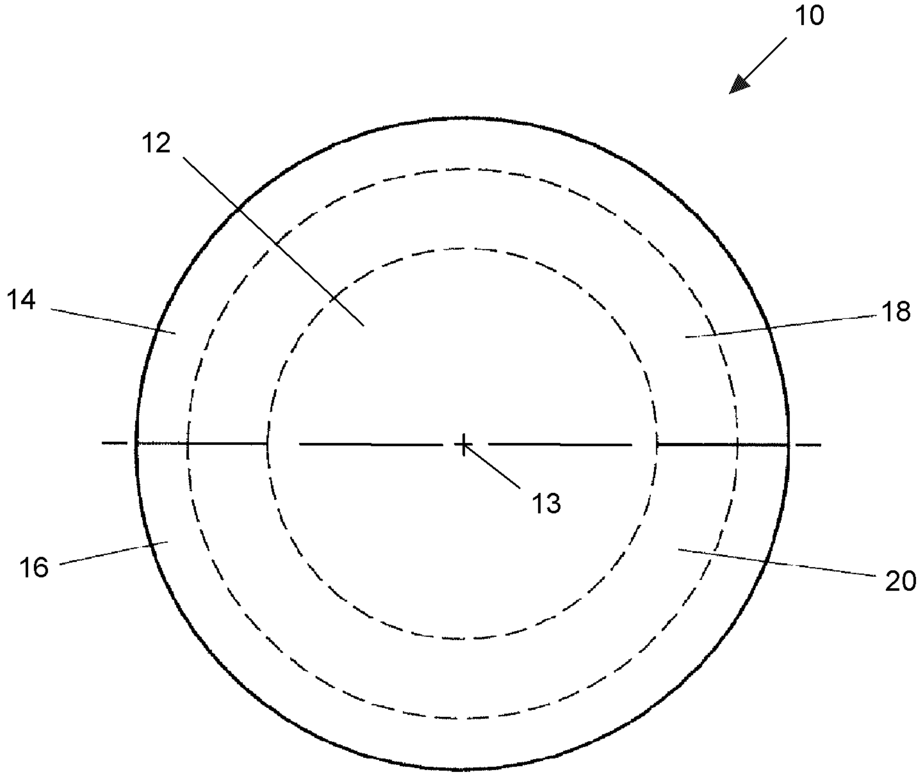
FIG. 1 schematically represents an axial view of a radial section through a turbine section of a gas turbine engine, including a turbine rotor and inner and outer shells that surround the turbine rotor.

FIG. 1 schematically represents a view looking axially at a turbine section of a gas turbine engine 10. The engine 10 comprises a turbine rotor 12 that rotates on an axis 13 thereof, and an assembly of multiple annular shells that includes complementary upper and lower outer turbine shells 14 and 16 and complementary upper and lower inner turbine shells 18 and 20 that are surrounded by the outer turbine shells 14 and 16 and immediately surround the rotor 12. The upper outer and inner turbine shells 14 and 18 are each located in an upper position relative to their respective lower outer and inner turbine shell 16 and 20. Likewise, the lower outer and inner turbine shells 16 and 20 can each be described as being located in a lower position relative to its respective upper outer and inner turbine shell 14 and 18. While the turbine engine 10 of FIG. 1 is represented as comprising a single upper inner shell 18 and a single lower inner shell 20, turbine sections with multiple additional upper and/or lower inner shells are also within the scope of the present invention.

Figure 2:
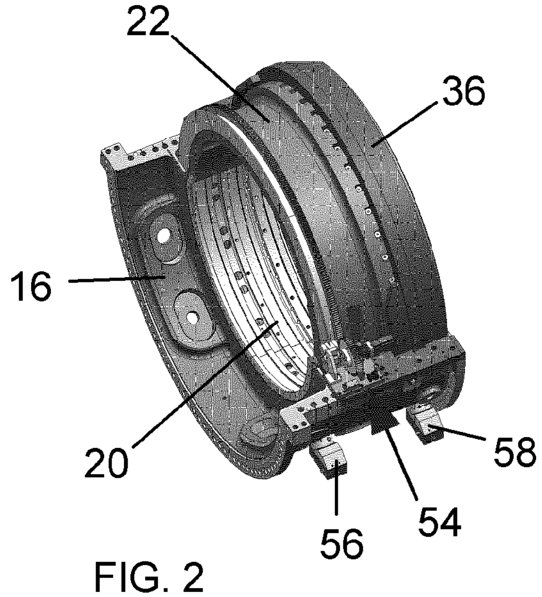
FIGS. 2, 3, and 4 represent perspective views of a lower turbine shell of a turbine engine and depict a process by which the shell can be rotated from a lower position thereof to an upper position through the use of a system in accordance with an embodiment of the invention.

While it is possible to gain access to the rotor 12 and other internal components of the turbine section of the engine 10 by completely disassembling the turbine section, inspections, maintenance, and repairs are preferably completed with the rotor 12 and internal components remaining in-situ. The method herein described involves removing the upper and lower inner shells 18 and 20 in order to provide full access to the rotor 12 and internal components of the turbine section of the engine 10 without the need for a more complicated disassembly of the turbine section. For this purpose, the upper outer shell 14 and the upper inner shell 18 are preferably first removed radially from their respective upper positions within the turbine engine 10, for example, raised with conventional lifting equipment. FIG. 2 represents a subsequent step, with the lower outer and inner shells 16 and 20 shown isolated from the remainder of the turbine engine 10 for purposes of clarity. As represented in FIG. 2, the upper inner shell 18 that was removed in the previous step has been replaced with a counterweight 22 that has been positioned in the upper position formally occupied by the upper inner shell 18. In addition, a thrust collar locator 36 has been positioned on and secured to the lower outer shell 16. FIG. 2 further shows a forward roller assembly 56 and an aft roller assembly 58 that are positioned externally to the lower outer shell 16 and penetrate the lower outer shell 16 to contact and support the lower inner shell 20. Though a single forward roller assembly 56 and a single aft roller assembly 58 are visible in FIG. 2, the lower inner shell 20 is preferably further supported, such as with a second forward roller assembly and a second aft roller assembly on the side of the lower outer shell 16 that is not visible in FIG. 2.

Figure 3:
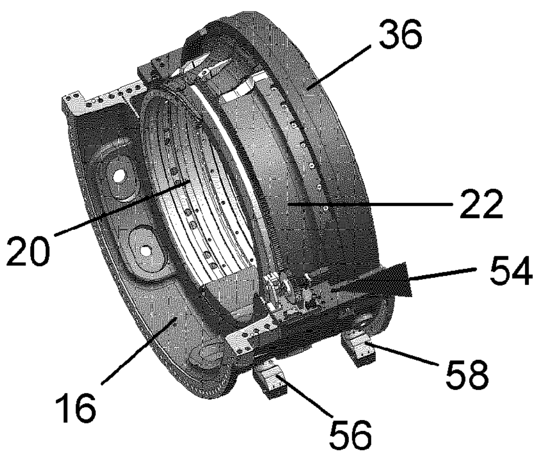
Figure 4:
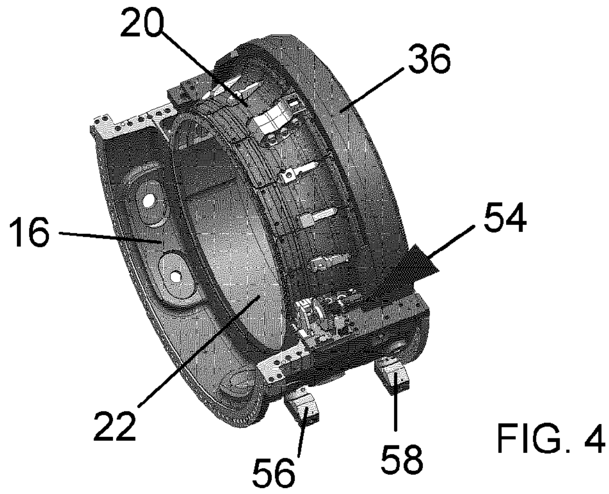
Figure 5:
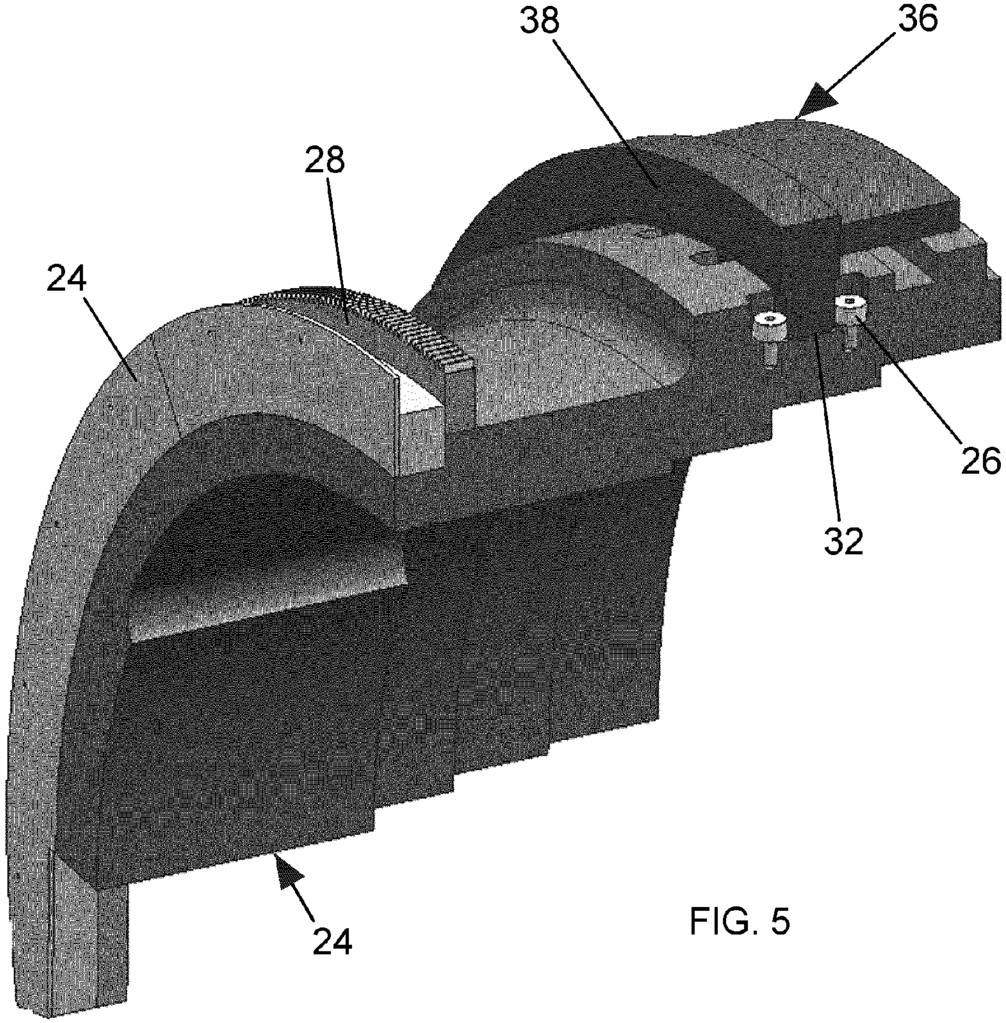
FIG. 5 represents a perspective view showing a cross-section through an assembly comprising a counterweight and thrust collar locator of the system represented in FIGS. 2 through 4.
Figure 6:
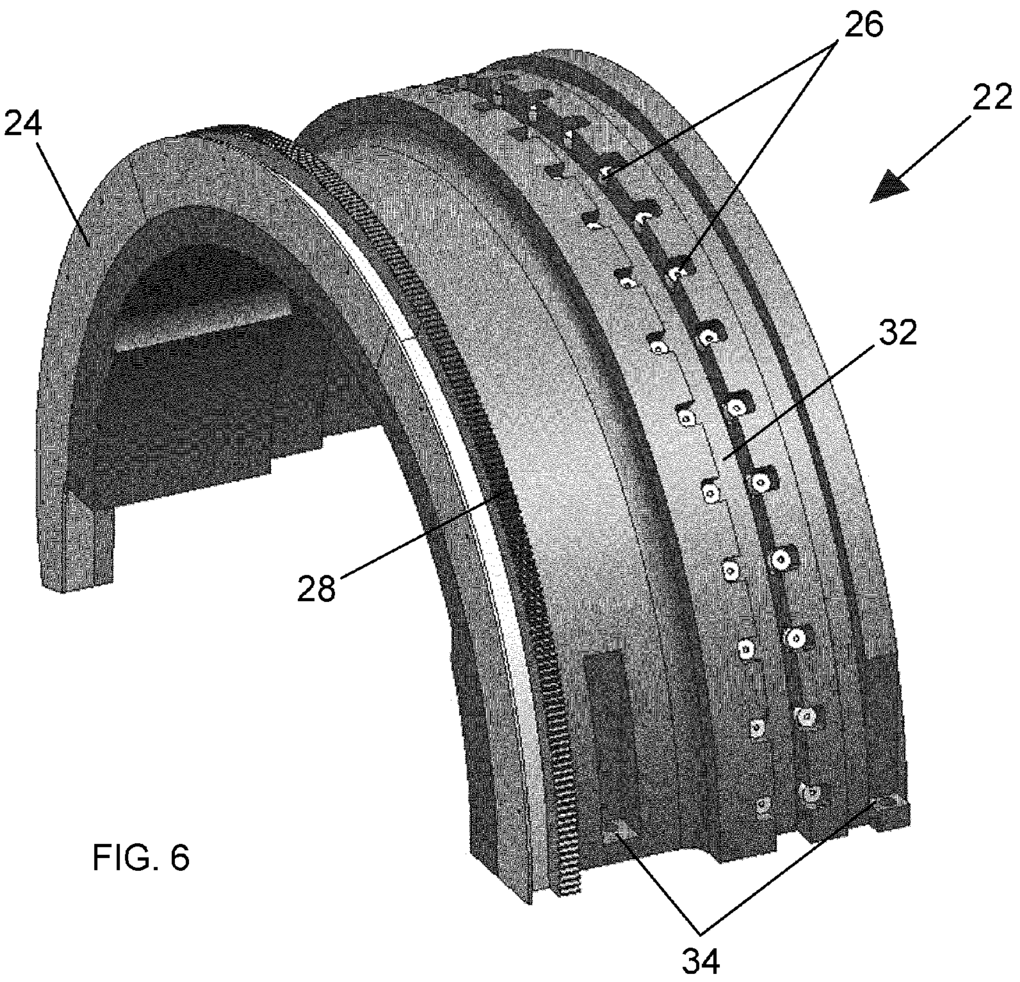
FIG. 6 represents an isolated perspective view of the counterweight of FIG. 5.
Figure 7:
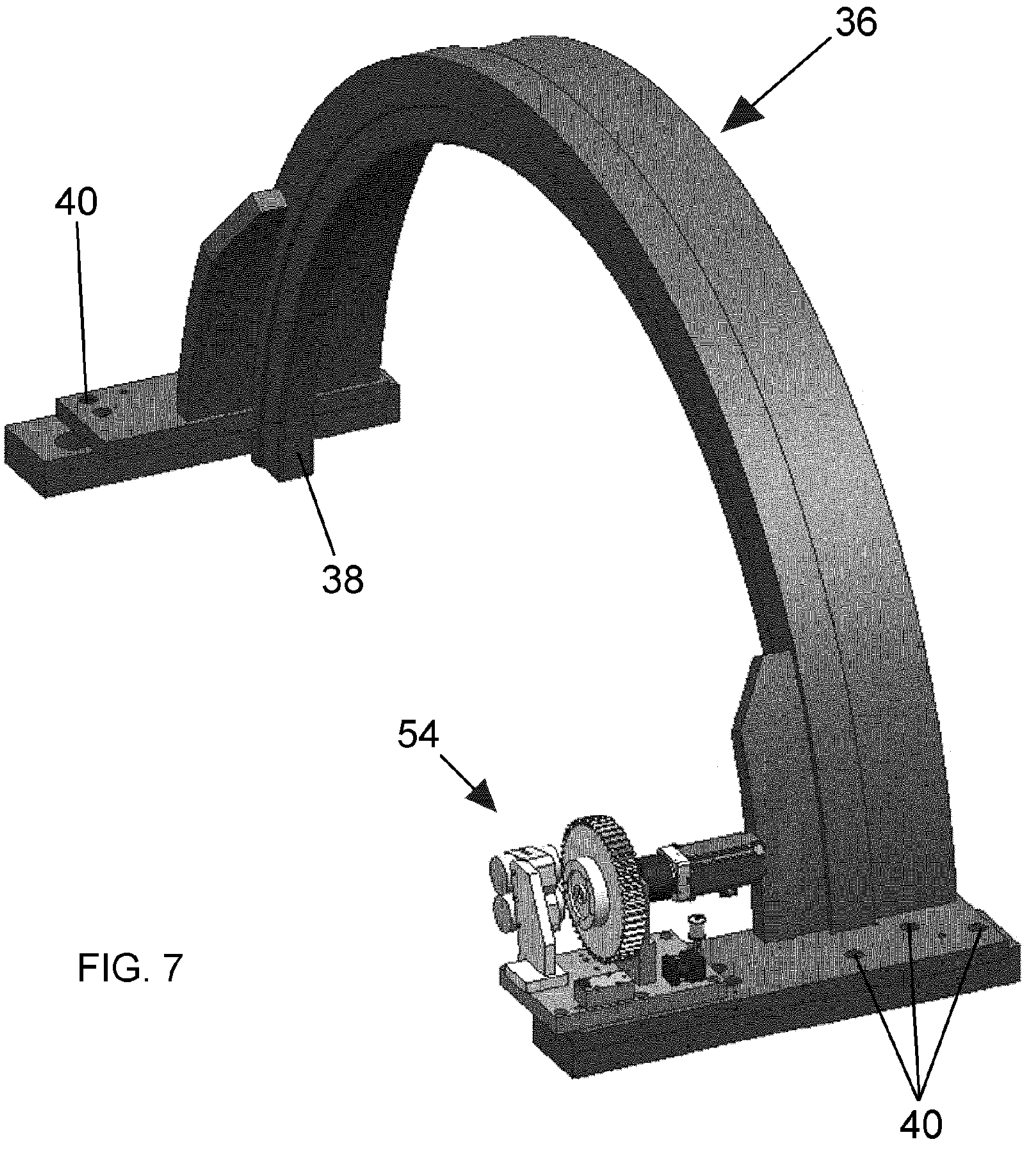
FIG. 7 represents an isolated perspective view of the thrust collar locator of FIG. 5.

The manner in which the counterweight 22 and thrust collar locator 36 are assembled together and interact is evident from a cross-sectional view represented in FIG. 5. As evident from FIGS. 6 and 7, the counterweight 22 and thrust collar locator 36 may each have a semi-annular shape, and more specifically an approximately 180-degree arc shape coinciding with the half-shell shapes of the upper inner and outer shells 18 and 14, respectively, that were previously removed. A drive system 54 mounted to the thrust collar locator 36 rotates the lower inner shell 20 and counterweight 22 in unison around their respective axes, which approximately coincide with the axis 13 of the rotor 12. The lower inner shell 20 and counterweight 22 are preferably continuously rotated until the counterweight 22 assumes the lower position originally occupied by the lower inner shell 20 and the lower inner shell 20 assumes the upper position originally occupied by the removed upper inner shell 18, the process of which is represented in FIGS. 3 and 4. In the case where, as represented in FIGS. 2, 6 and 7, the counterweight 22 and thrust collar locator 36 each have an approximately 180-degree arc shape, the drive system 54 is preferably capable of continuously rotating the counterweight 22 at least 180 degrees from the upper position to the lower position, and in so doing is able to rotate the lower inner shell 20 approximately 180 degrees from its original lower position to the upper position that was originally occupied by the upper inner shell 18. Once in the upper position represented in FIG. 4, the lower inner shell 20 may be removed radially from the turbine engine 10 in essentially the same manner as was the upper inner shell 18, and thereby allow for maintenance of all turbine components that were previously circumscribed by the upper and lower inner shells 18 and 20.

Once positioned on the lower inner shell 20 (FIG. 2), the counterweight 22 can be secured to the lower inner shell 20 by bolting locations 34, two of which are visible in FIG. 6. The counterweight 22 further comprises a brake plate 24 and gear rack 28 that interact with the drive system 54 of the thrust collar locator 36. Once positioned on the lower outer shell 16, the thrust collar locator 36 can be secured to the lower outer shell 16 by bolting locations 40, three of which are visible in FIG. 7. FIGS. 5 and 7 represent the thrust collar locator 36 as comprising a thrust collar 38 that is positioned within a channel 32 of the counterweight 22. By securing the counterweight 22 to the lower inner shell 20 and coupling the counterweight 22 to the thrust collar locator 36 in the manner shown and described above, the thrust collar 38 is able to provide support to the lower inner shell 20 and counterweight 22, permit the counterweight 22 and lower inner shell 20 to rotate in unison relative to the thrust collar locator 36, and maintain axial alignment of the counterweight 22 and the lower inner shell 20 with each other and with the axis 13 of the rotor 12 as the counterweight 22 and lower inner shell 20 are rotated together. Axial rollers 26 positioned on the outermost surface of the counterweight 22 adjacent to the channel 32 serve as contact points between the thrust collar 38 and the counterweight 22 during operation, promoting the ability of the counterweight 22 to rotate relative to the thrust collar locator 36.

Figure 8:
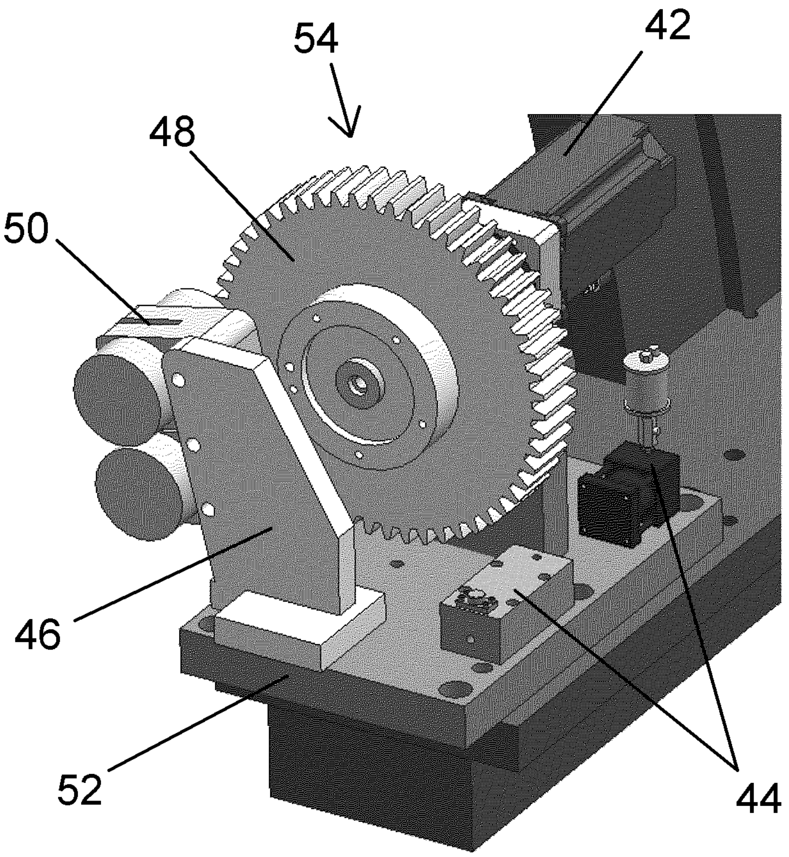
FIG. 8 represents a perspective view of a drive system of the system represented in FIGS. 2 through 4.

A perspective view of the drive system 54 is represented in FIG. 8. The drive system 54 is shown as a gear-based system comprising a gear 48 powered by motor 42. The motor 42 may be electric, hydraulic, pneumatic or any other type of motor suitable for powering the drive system 54. The gear 48 is adapted to engage the gear rack 28 of the counterweight 22 to rotate the counterweight 22 relative to the thrust collar locator 36. While a gear-based system is represented in the figures, other drive systems capable of rotating the lower inner shell 20 and counterweight 22 are also foreseeable, including but not limited to chain, hydraulic, pneumatic, and/or friction drive systems.

The drive system 54 is located on a support plate 52 together with a pressure amplifier 44 and a hydraulic friction braking unit 46. The braking unit 46 comprises a brake slot 50 that, during operation, engages the brake plate 24 of the counterweight 22. The pressure amplifier 44 and braking unit 46 apply friction to the brake plate 24 in order to slow or stop the rotation of counterweight 22 as well as secure its position while stationary. While a disk-type braking system is represented in the figures, other types of braking systems could be used.

Figure 9:
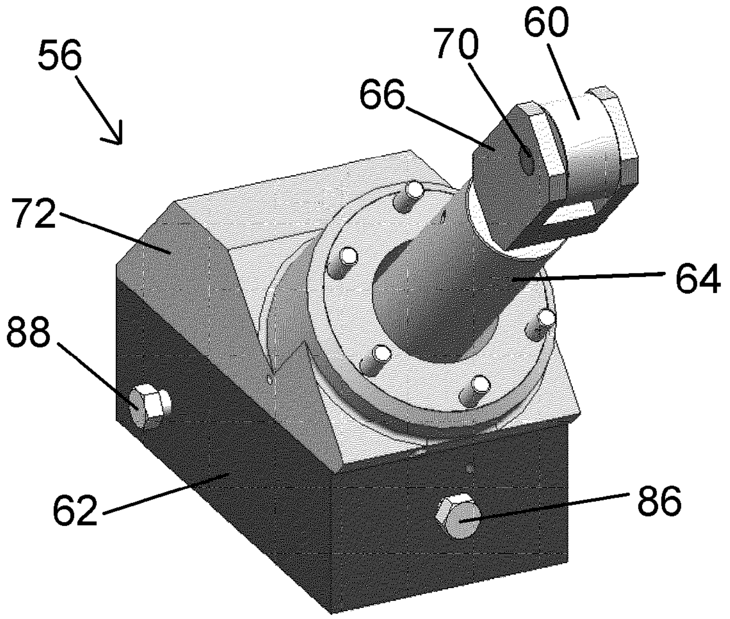
FIG. 9 represents a perspective view of a forward roller assembly of the system represented in FIGS. 2 through 4.
Figure 10:
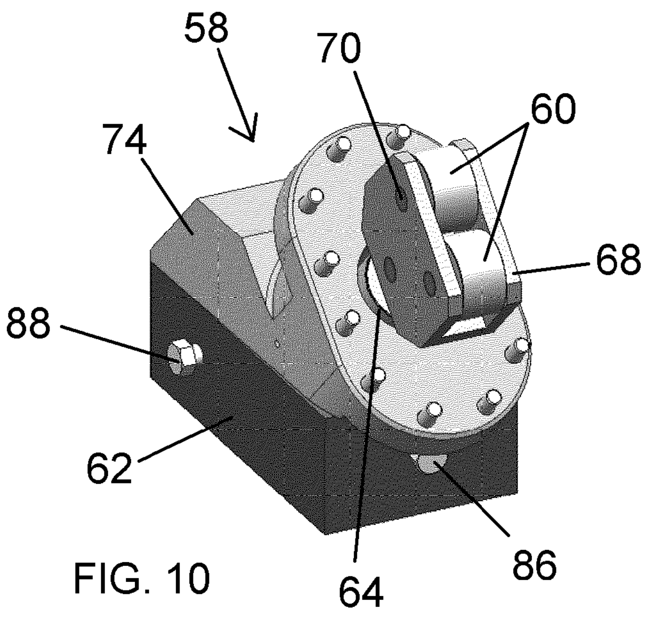
FIG. 10 represents a perspective view of an aft roller assembly of the system represented in FIGS. 2 through 4.
Figure 11:
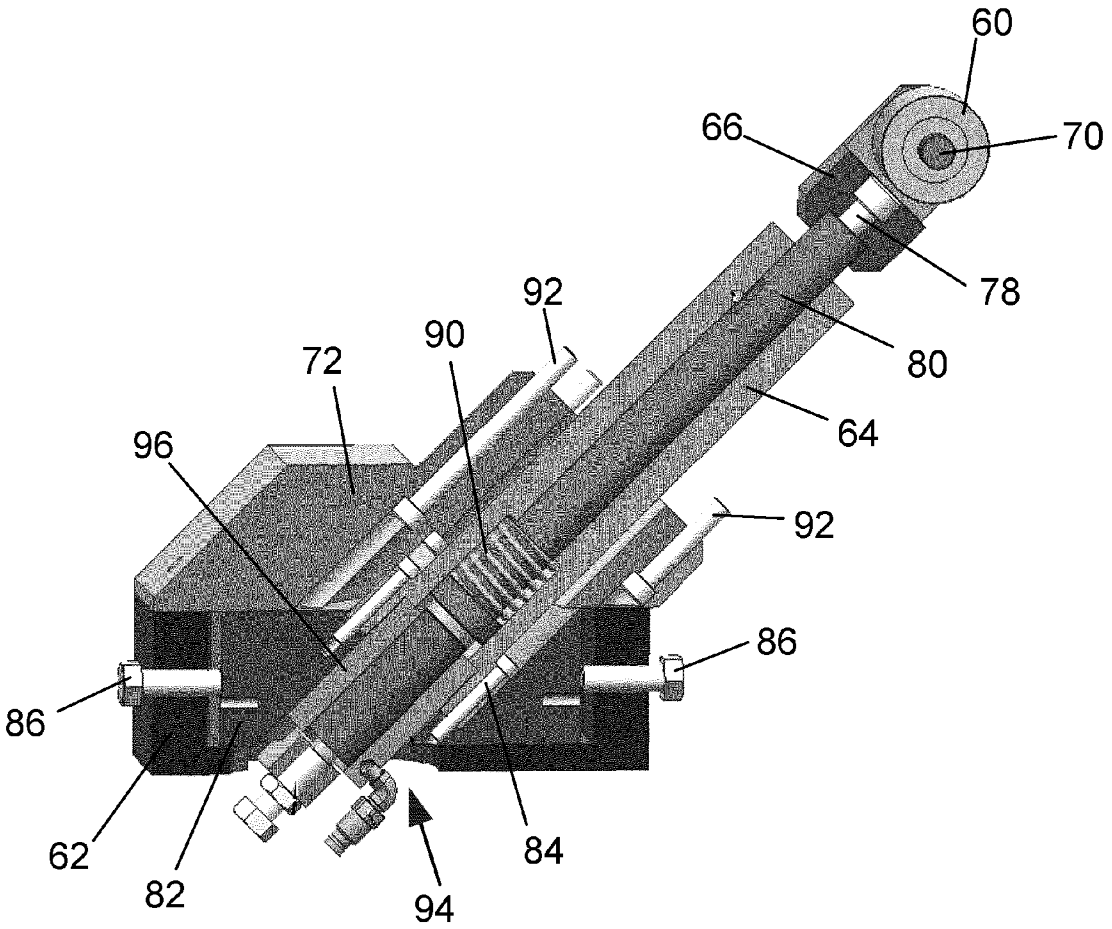
FIG. 11 represents a cross-sectional view of the forward roller assembly of FIG. 9.

FIGS. 9 and 10 represent isolated views of the forward and aft roller assemblies 56 and 58 that are positioned externally to the lower outer shell 16 and contact and support the lower inner shell 20 during rotation. FIG. 11 represents a cross-sectional view of the forward roller assembly 56 of FIG. 9, and represents the manner in which at least the forward roller assemblies 56 can be adapted to actuate for the purpose of engaging and adjustably supporting the lower inner shell 20. It should be understood that, though FIG. 11 depicts one of the forward roller assemblies 56, each forward roller assembly 56 as well as one or more of the aft roller assemblies 58 can be configured in essentially the same manner as shown in FIG. 11 and discussed below.

The forward and aft roller assemblies 56 and 58 are used in combination to ensure proper alignment of the lower inner shell 20 during its removal and reinstallation. Each roller assembly 56 and 58 is represented in FIGS. 9 and 10 as comprising rollers 60 located in either a single fixture 66 or a double fixture 68 that rotatably supports axles 70 of the rollers 60. The fixtures 66 and 68 are represented as being supported by cylinders 64 mounted in housings 72 and 74, which in turn are each supported with a base 62. As evident from FIG. 11, the cylinder 64 of the forward roller assembly 56 can be secured with bolts 84 to its housing 72. Furthermore, from FIG. 11 it can be seen that an adjustment block 82 associated with the housing 72 is received in a cavity within its base 62. FIG. 11 represents a manner in which the position of the adjustment block 82 can be adjusted and fixed with thumb screws 86 and 88 relative to the base 62 in the plane thereof (corresponding to the lateral and axial directions of the turbine section). As previously noted, the aft roller assembly 58 can be provided with the same or similar adjustment capability as that shown in FIG. 11.

As also evident from FIG. 11, the fixture 66 is mounted on a shaft 78 received in an inner cylinder 80, which itself is received in the cylinder 64. A hydraulic jack arrangement 94 allows for the extension and retraction of the inner cylinder 80 and the attached rollers 60 relative to the cylinder 64 for the purpose of rotatably supporting the assembly formed by the lower inner shell 20 and counterweight 22, as well as lifting and lowering this assembly to ensure its proper alignment with the axis 13 of the rotor 12. Although a hydraulic jack is shown, other means for actuating the rollers 60 are also foreseeable and within the scope of the invention. A spring 90 biases the inner cylinder 80 into a retracted position within the outer cylinder 64. The hydraulic jack arrangement 94 includes a mechanical stop 96 that positively limits the extent to which the inner cylinder 80 is able to be retracted.

While the invention has been described in terms of certain embodiments, it is apparent that other forms could be adopted by one skilled in the art. Therefore, the scope of the invention is to be limited only by the following claims.

The invention claimed is:

1. A system for installing and removing a shell from an assembly of multiple annular shells comprising at least an upper shell and a complementary lower shell assembled with the upper shell so that the upper shell is in an upper position relative to the lower shell and the lower shell is in a lower position relative to the upper shell, the system comprising:

a counterweight adapted to replace the upper shell in the upper position and be secured to the lower shell;

means for rotating the counterweight and the lower shell in unison until the lower shell is in the upper position and the counterweight is in the lower position; and means for maintaining axial alignment of the counterweight and the lower shell as the counterweight and the lower shell are rotated by the rotating means, wherein the assembly of multiple annular shells further comprises at least an outer upper shell and a complementary outer lower shell assembled with the outer upper shell so that the outer upper shell is in an outer upper position relative to the outer lower shell, and the means for maintaining axial alignment comprises a thrust collar locator having a thrust collar adapted to be secured to the outer lower shell, engage the counterweight to permit the counterweight to rotate relative to the thrust collar locator, and maintain the axial alignment of the counterweight and the lower inner shell during rotation thereof.

2. The system according to claim 1, wherein the rotating means comprises means for continuously rotating in unison the counterweight and the lower shell to move the lower shell from the lower position to the upper position and to move the counterweight from the upper position to the lower position.

3. The system according to claim 1, wherein the rotating means is adapted to rotate the counterweight and the lower shell at least 180 degrees.

4. The system according to claim 1, further comprising roller assemblies adapted to support the counterweight and the lower shell during rotation thereof.

5. The system according to claim 4, wherein at least one of the roller assemblies comprises a jacking system capable of lifting and lowering the counterweight and the lower inner shell.

6. The system according to claim 1, wherein the rotating means further comprises a gear drive engaged with a gear rack on the counterweight.

7. The system according to claim 1, wherein the rotating means further comprises a braking unit engaged with the counterweight and adapted to brake the rotation of the counterweight and the lower shell.

8. A system for installing and removing a shell from an assembly of multiple annular shells comprising at least an upper shell and a complementary lower shell assembled with the upper shell so that the upper shell is in an upper position relative to the lower shell and the lower shell is in a lower position relative to the upper shell, the system comprising:

a counterweight adapted to replace the upper shell in the upper position and be secured to the lower shell; and means for rotating the counterweight and the lower shell in unison until the lower shell is in the upper position and the counterweight is in the lower position, the rotating means comprising a thrust collar locator having a thrust collar engaged with the counterweight to support the counterweight, permit the counterweight to rotate relative to the thrust collar locator, and maintain axial alignment of the counterweight and the lower inner shell during rotation thereof.

* * * * *